United States Patent [19]
Euer et al.

[11] 3,742,352
[45] June 26, 1973

[54] APPARATUS AND METHOD FOR MEASURING AND ANALYZING DYNAMIC PROCESSES

[76] Inventors: Hartmut Euer, Bad Wiesseestrasse 2; Gunter Pauli, Aindorfer Strasse 112, both of Munich, Germany

[22] Filed: Nov. 26, 1971

[21] Appl. No.: 202,443

Related U.S. Application Data

[63] Continuation-in-part of Ser. No. 30,885, April 22, 1970, Pat. No. 3,665,505.

[30] Foreign Application Priority Data

Dec. 2, 1970 Germany.................. P 20 59 195.1

[52] U.S. Cl................................................. 324/77 A
[51] Int. Cl....................... G01r 23/16, G01r 27/02
[58] Field of Search................................. 324/77 A

[56] References Cited
UNITED STATES PATENTS

| | | |
|---|---|---|
| 2,970,261 | 1/1961 | Zoll................. 324/77 A X |
| 3,122,732 | 2/1964 | Lewinstein et al............ 324/77 A X |
| 3,243,656 | 3/1966 | Baude...................... 324/77 A X |
| 3,270,205 | 8/1966 | Ladd et al...................... 324/77 A |

Primary Examiner—Stanley T. Krawczewicz
Attorney—Smyth, Roston & Pavitt

[57] ABSTRACT

Apparatus and method for analyzing dynamic processes represented by a particular time variable information signal within a range for amplitudes of the signal, wherein a signal analyzing amplitude band is defined by dual analog to digital conversion to separate signal peaks (positive or negative) when occurring within the band. The digital signals are processed as logic signals, whereby the sign bit is used to provide particular distincting between relative and absolute peaks. By means of scan signal the analyzing band is shifted across the amplitude range and the detected peaks are accumulated as statistical representation in dependence upon the position of the analyzing band within the amplitude range.

12 Claims, 10 Drawing Figures

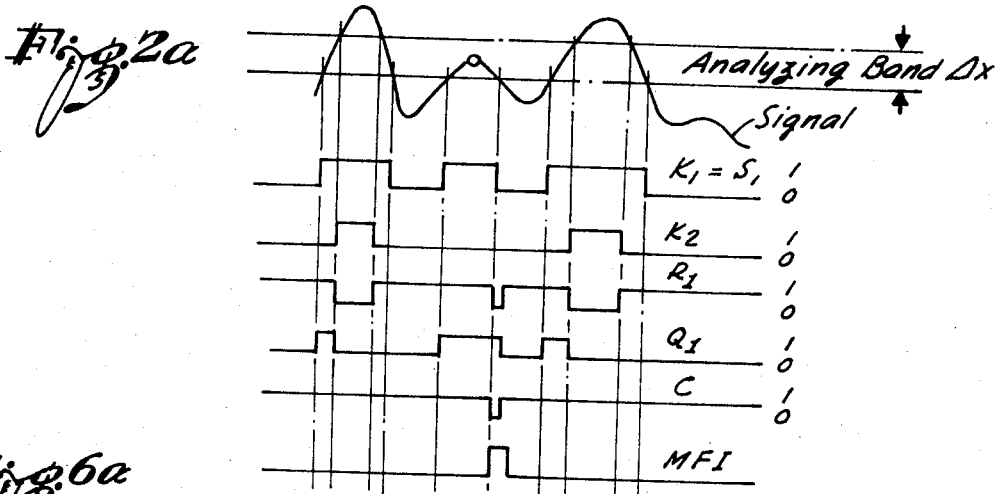
Fig. 2a
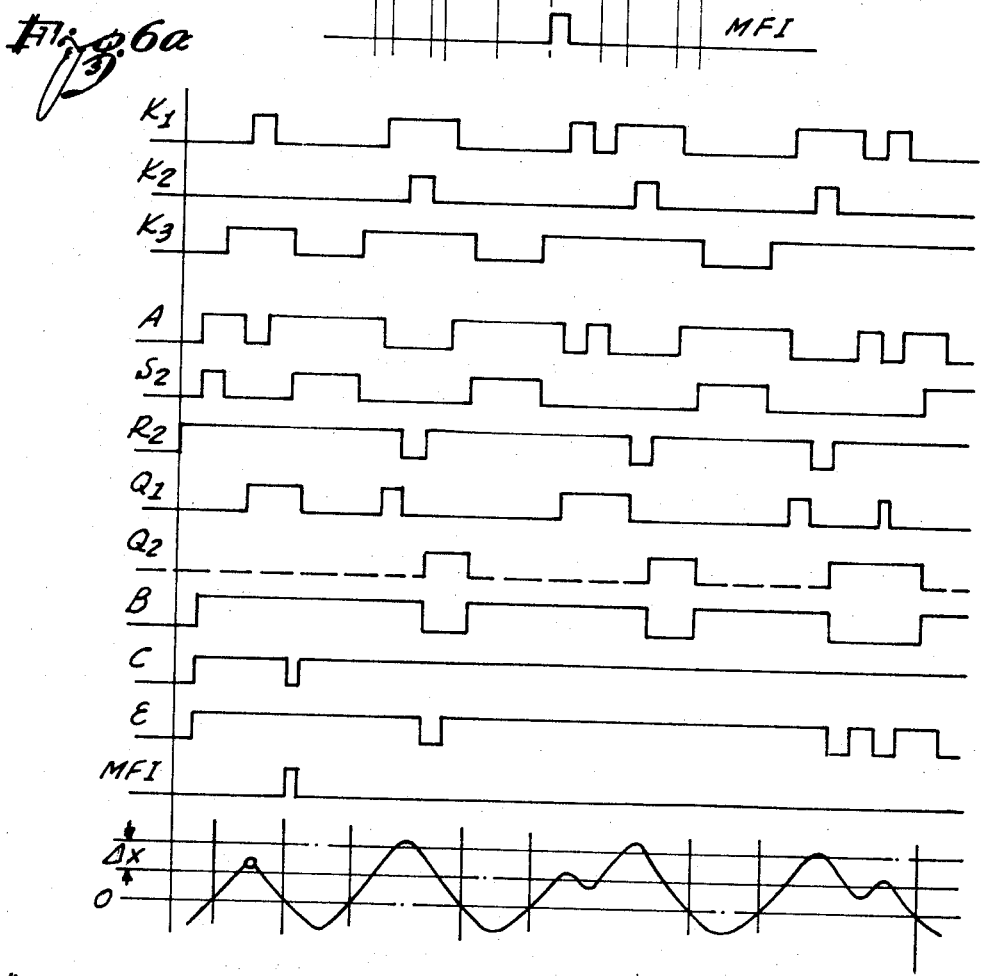
Fig. 6a
Fig. 6c
| $Q_2$ | 0 | 1 |
|---|---|---|
| $S_2$ | 01 | – |
| $R_2$ | – | 01 |
Fig. 6b
| $Q_1$ | 0 | 1 |
|---|---|---|
| $S_1$ | – | 01 |
| $R_1$ | 10 | – |

3,742,352

APPARATUS AND METHOD FOR MEASURING AND ANALYZING DYNAMIC PROCESSES

This application is a continuation-in-part application of Ser. No. 30,885, filed Apr. 22, 1970, now U.S. Letters Pat. No. 3,665,505.

The present invention relates to a method and apparatus for measuring and analyzing dynamic processes, wherein particularly the behavior of a physical quantity in time is anayzed and processed by detecting particular events which occur in analyzing bands and counting the frequency of occurrence to obtain statistical, characteristic functions. The invention relates particularly to the statistical analyzation of signals seemingly having random behavior as a result of superpositioning of different phenomena.

It is known to develop statistical characteristic function of any kind of dynamic process in that the behavior in time, i.e., the temporal characteristics of the respective physical quantity is investigated as to particlar events within a particular range or continuum of amplitides. For this it is customary to subdivide the analyzing range of the physical quantity into several analyzing bands which run in parallel to the time axis (see for example German printed patent application No. 1,448,771). The particular events of interest are counted individually as they occur in the individual analyzing bands. This method, however, has the disadvantage that the accuracy of the resulting characteristic function depends upon the number of analyzing bands are thus defined, i.e., the accuracy depends upon the resolution of subdivision of the analyzing range. It is rather uneconomical to provide equipment so as to subdivide the analyzing amplitude range in as many small analyzing bands as required for particular requirements as to resolution. As a consequence, the ascertained characteristic functions include considerable errors.

The teaching of the invention has as its principal task to avoid these disadvantages. The disadvantages are avoided by converting the characteristic functions into low resolution digital signals at different amplitude levels for bit valve changes thereby providing an analyzing band which is also variable in width (that is the dimension transverse to the time axis), by causing the analyzing band to progressively scan the analyzing amplitude range. The sign bit generated as part of the conversion is shifted into and out of the processing circuitry for distinguishing for example between relative and absolute maxima or minima The detected events are individually represented by logic signals which are counted, and the counting result is considered in relation to the amplitude value defining the current position of the analyzing band within the amplitude range.

This method offers the possibility of ascertaining characteristic functions with comparatively little expenditure. For example, the distribution and frequency of relative or absolute maxima or minima may readily be detected. Also, probability distribution and distribution density can readily be ascertained. The analyzing area may be scanned by shifting the analyzing band across the amplitude range gradually or in finite steps. In case of a stepwise scanning of the amplitude range it is of advantage of match the width of the analyzing band with the width of the stip for shifting the analyzing band with the width of the step for shifting the analyzing band across the analyzing range. Also, the scanning speed for the analyzing band can be varied within selected limits and direction of scanning may be reversed.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 2a shows a pulse diagram illustrating signals developed in the circuit of FIG. 1a for the detection of relative maxima;

FIG. 6a shows pulse diagrams illustrating signals developed in the circuit of FIG. 1a for the detection of absolute maxima; and FIGS. 6b and 6c are truth tables.

Figure 1:
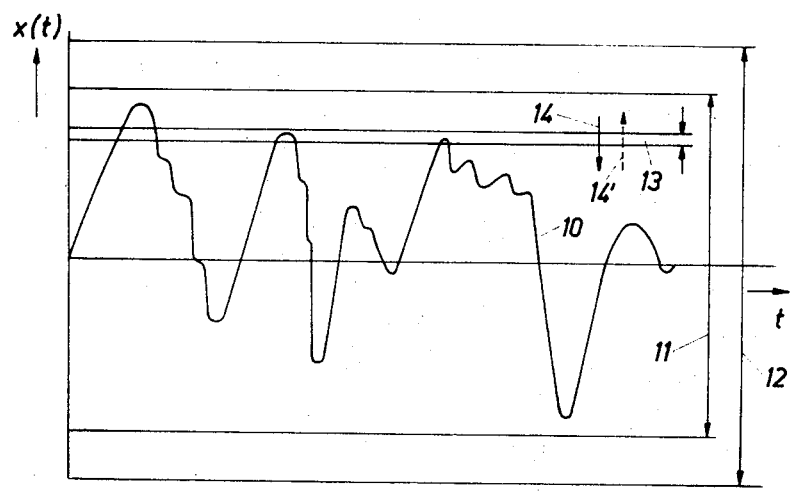
FIG. 1 illustrates schematically a plot of a function representing a physical quantity variable in time.

Proceeding now to a detailed description of the drawings, in FIG. 1 thereof a curve 10 has been plotted representing, for example, the instantaneous magnitude of a physical quantity, for example the amplitude of a particular event as it varies in time and being represented by a function of X of time $t$. The curve to be analyzed, may, for example, represent a frequency distribution resulting from investigating the strength of material; or the curve may represent a composite signal, such as acoustic signal or the like with seemingly random distribution of signal peaks of different amplitude, and the amplitude distribution is to be ascertained and statistically evaluated.

The double arrow 12 denotes the total amplitude range in which amplitude values of the curve 10 are expected to be found; it is basically assumed that function $X(t)$, as representing the phenomenon to be investigated, has a range for amplitude values which, for example, for principle reasons will not exceed that amplitude range. For example, that range 12 may be defined by maximum response limit of measuring transducers. Or in case, the curve represents an attenuated output, the range 12 is defined by the input, and the attenuation is the subject of the investigation.

In the general case an analyzing area or range 11 may be defined within, for example, the theoretical amplitude range 12, which range 11 may be equal to the total amplitude range but may be smaller due to additional, for example, practical restrictions on the representation of the quantity as represented by the curve. The analyzing area 11, as plotted in FIG. 1, therefore, is expected to cover a smaller amplitude range than range 12. The size of the analyzing range 11 may also be defined as the signal range in case the phenomenon to be investigated is represented by a signal which is processed in an attenuating amplifier, or it may be that range in which the particular phenomena of investigatory interest are expected to occur. It is, furthermore, presumed that the amplitude limits defining the range 11 are selectively variable within the total range 12.

Reference numeral 13 now refers to a particular analyzing band running, of course, parallel to the time axis $t$ and being defined in any instant within amplitude range 11. The analyzing band is defined by double analog to digital signal conversion at low resolution, whereby upper and lower band limits are established by two different analog amplitude levels for bit value changes, for example, of the most significant bit of the conversion. The analyzing band 13 is selected to have a variable width, corresponding to a variable spread in conversion difference, and the width represents or is related to the revolution of the analyzing process. The analyzing band 13 is made to progressively cover the range 11, i.e., range 11 is progressively scanned in the direction of arrow 14 or in the opposite direction 14, by progressively shifting band 13 across that amplitude range.

As the analyzing band 13 is shifted across analyzing range 11, for example in incremental steps, particular events occurring within the analyzing band are counted; for example, the number of maxima or minima, i.e., particularly directed excursion peaks of the curve 10 are counted, and the count number is associated with the particular position of the analyzing band within the amplitude range. The position of the band may be defined by the amplitude value of its center, and the band spreads for half the band width above and below that center amplitude. The various counting results as resulting from different band positions, are processed further to ascertain the desired characteristic function in dependence upon amplitude.

The analyzing speed, i.e., the speed of progression of analyzing band 13 across the analyzing range 11, should be variable to a considerable extent and may match particular requirements in any particular case. That band 13 may progress in steps, i.e., intermittently or on a continuous, uninterrupted basis. In case of stepwise progression of analyzing band 13 the amplitude equivalent of each step should be equal to the width of the band 13, or there should be a definite relation between step height and band width to obtain, for example, definite overlap. In any event, selection of width of the analyzing band and selection of the width of the steps of analyzing band progression should be coupled.

Figure 1A:
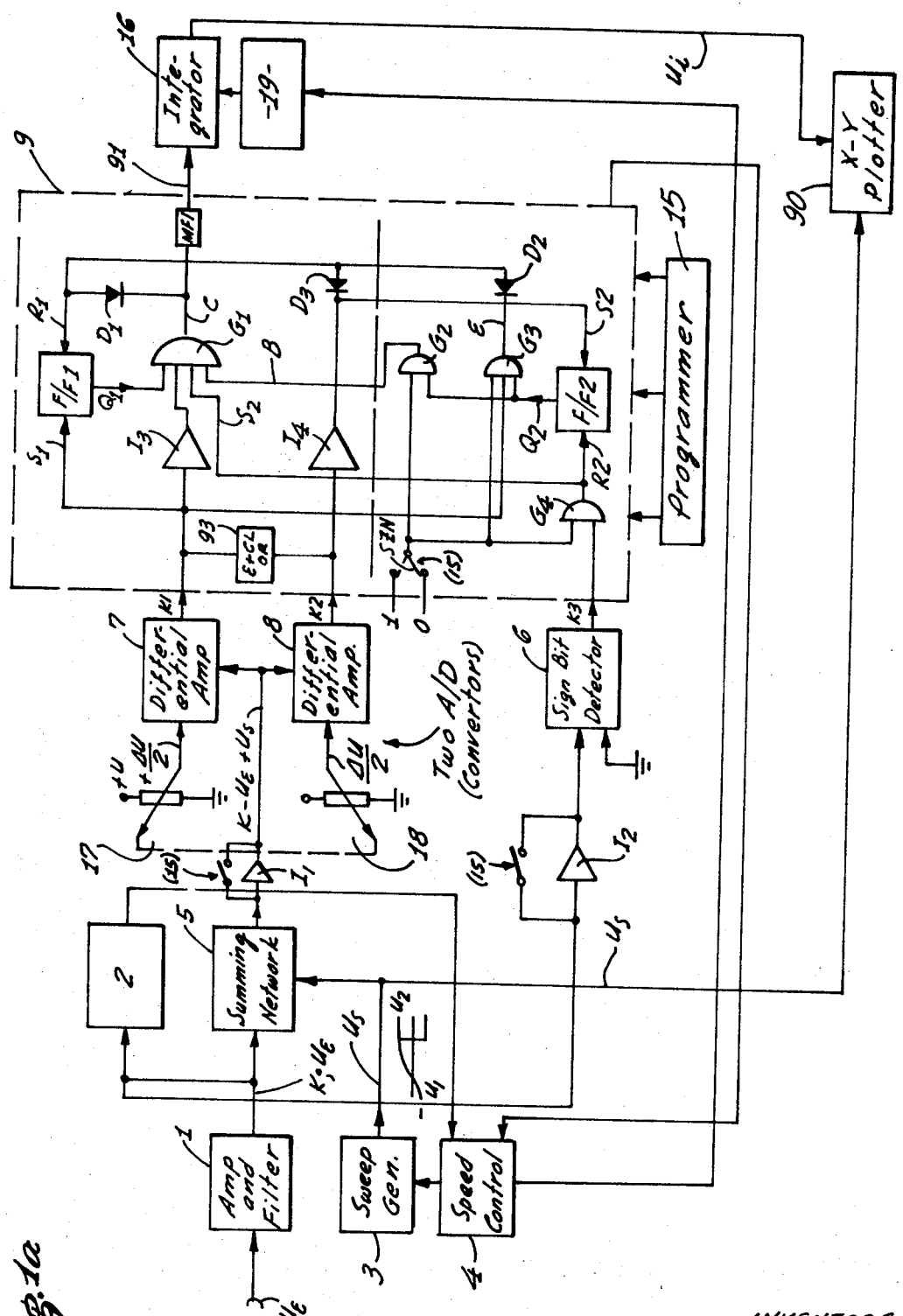
FIG. 1a illustrates a block diagram of an apparatus for practicing the preferred embodiment of the invention.

Turning now to the description of FIG. 1a there is illustrated equipment for carrying out the inventive process. A measuring instrument, transducer or the like, is assumed to develop an electrical signal $U_E$, representing the process to be investigated and analyzed. As an inherent result of the investigatory process or due to threshold behavior of the instrumentation, the signal $U_E$ may have amplitude not exceeding the range 12.

An input circuit 1 is provided to receive signal $U_E$ and to provide appropriate amplification or attenuation as well as impedance matching for the circuitry processing the signal $U_E$ or a replica thereof. The input circuit 1 may include filters and particularly any d.c. components may be removed from the signal to restrict the analyzing process to variable reproduced phenomina and to eliminate, for example, quasi-stationary components.

The output signal of input stage 1 is denoted $K.U_E$, wherein K represents the amplification or gain in circuit 1. In particular, the gain of unit 1 as to a.c. components may be below unity, so that the signal $K.U_E$ varies only within the range 11. The signal $K.U_E$ is fed to a processing stage determining the variance $\sigma$, so that the width $\Delta U$ of the analyzing band 13, as well as the amplitude differential defined by the limits for the analyzing range 11, can be represented in units of $\sigma$.

The relative position of the analyzing band as well as the progressive shifting thereof across the analyzing range is provided by a saw tooth signal generator 3, providing a voltage $U_s$ that varies gradually or in steps. An input section 4 is provided as control stage to establish the slope of the sawtooth wave; more generally, the rate of change of the output of generator 3 is established by this control stage. Accordingly, automatic or manual setting of stage 4 determines the speed of the scanning process according to which an analyzing band is shifted across the range of amplitudes subject to the investigation. That scanning and shifting speed does not have to be uniform but may vary even during an investigatory run. By way of example, the scan speed can be fast at first, until an information signal is detected for the first time that will be represented for example by a signal K2 whose development will be determined shortly. As soon as K2 occurs, the scan speed will be reduced; K2 can be used in 4, for example, for switching an impedance. The analyzing band should not be caused to dwell in any section of the amplitude range for which sufficient information has been sampled, nor should the band scan an important range portion at too fast a speed as the counting of events should yield statistically meaningful results.

The input stage 4 determines and establishes also the range 11 to be covered by the scan, for example, in dependence upon the variance $\sigma$. This includes providing of a first signal level $U_1$ and of a second signal level $U_2$ in between which scan signal $U_s$ varies from $U_1$ as negative equivalent of the maximum amplitude, corresponding to the maximum limit X max as upper limit of range 11, the variation to occur towards more positive values, to $U_2$, corresponding to the positive equivalent of the negative limit X min, which is the lower limit of range 11. In case input device 1 removes d.c. components from the information signals, analyzing range 11 should be provided to extent symmetrical to the zero line. Thus, $U_1 = U_2$. This, however, is not essential in principal but merely facilitates instrumentation and design.

The output signal $U_s$ is actually the negative equivalent of the center amplitude of the analyzing band. A summing network 5 is provided to algebraically add the information signal $K.U_E$ to the scan voltage $U_s$. The composite output signal of adder 5, $K.U_E + U_s$, is passed to one input each of the two low resolution analog to digital converters each represented by a single comparator, 7 and 8, respectively. They are constructed, for example, as differential amplifiers, with very high gain and saturation behavior at a first level when the signal input, as derived from adder 5 exceeds the respective reference signal, and at a second level when that input is below the respective reference.

The second input of comparator 7 receives a reference signal $+ \Delta U/2$ as derived from an adjustible voltage source 17, the second input of comparator 8 receives a reference signal $- \Delta U/2$ as derived from an adjustible voltage source 18. This way the amplitude levels for bit value changes produced by by each comparator differ. An instantaneous signal $K \cdot U_E$ has value within the band in case $- \Delta U/2 < K.U_E + U_s < + \Delta U/2$. Thus, the analyzing band is established by the range defined by $-U_s - \Delta U/2$ and $-U_s + \Delta/2$, and voltage $\Delta U$ defines the width of the analyzing band. The two adjustable reference sources 17 and 18 are shown with interconnected adjustment. That adjustment may be controlled in response to the output by variance detector 2.

It follows from the foregoing, that the outputs of comparators 7 and 8 are dissimilar when the composite signal $K.U_E + U_2$ is larger than $- \Delta U/2$ but smaller than $+ \Delta U/2$. Similarity of outputs of comparators 7 and 8 establishes that the information signal $K.U_E$ is outside of the analyzing band. A logic circuit 9 responds to these conditions. However, different logic combinations may lead to detection of different kinds of characteristica, as will be developed more fully below.

As illustrated, the logic circuit 9 receives additional information. For example, a zero-crossing detector or differential amplifier with one grounded input 6 responds to each polarity reversal of the information signal. Actually, this circuit 6 is another a/d converter which provides a true signal for the information signal. Thus, element 6 can be regarded as shared by the two low resolution conversion processes. It may be presumed that sign bit detector 6 is a comparator comparing signal $K.U_E + U_{2s}$ with ground potential or zero as reference. Detector 6 provides a first signal level output when the information signal has positive polarity, and a second signal level when the information signal has negative polarity. The logic circuit 9 may include various components all of which are not operating at all times. A programmer 15 is provided to establish enabling signals to several logic gates etc. in circuit 9 to combine the inputs for the circuit so as to render the circuit responsive to the desired phenomena. Different analyzing programs will be explained below.

Logic circuit 9 has an output channel in which appear pulses or signals that are representative of detected specific events to which the circuit has been rendered responsive by programmer 15. A counter 16 is connected to receive the pulses and counts same. The counter 16 may operate digitally or as pulse integrator, the output of which represents the accumulated frequency of the events observed and detected. If the counter 16 is an integrator with fairly short time constant, the output actually represents counted events per chosen time unit. A control circuit 19 is provided to control the time constant of the counter 16, for example, in dependence upon the saw tooth signal to match the integrating-per-unit time process to the rage of change of the generator 3.

As stated above, generator 3 may change output $U_s$ in steps and holding the respective output for a period during which counter 16 counts events. With each step of generator 13 the counter or integrator is reset to begin counting anew.

The output signal $U_i$ of event counter 16 may appear in digital or analog format and is of statistical significance. Signal $U_i$ is correlated with the signal $U_s$ defining the amplitude center value of the band. The signals $U_i$ and $U_s$ may be used as inputs for an X-Y plotter 90 to graphically record the characteristic statistical function in dependence upon amplitude.

We have developed above that the three differential amplifiers 6, 7 and 8 develop three logic signals respectively K1, K2 and K3; the processing of these logic signals will be described next. Signal K1 when true sets a flip-flop FF1 of the latch or J.K. variety. The set side output Q1 of the flip-flop is a first input for an NAND gate G1. Signal K1 is inverted at I3, whose output A ($=\overline{K1}$) is a second input for gate G1. Signal K1 is used additionally as input to another NAND gate G3.

The second logic signal K2 is inverted at I4, and the sign bit K3 is fed directly to one input of an NAND gate G4. A selector switch SZN which can be regarded as a component of the programmer, provides logic 1 or logic 0 to inputs of gates G3 and G4 as well as to another NAND gate, G2. The output of G4 serves as a third input for gate G1 as well as reset input for a flip-flop FF2, whose output is the second input for gate G2 and a third input for gate G3. The output of gate G2 is the fourth input for gate G1.

The output of gate G1 connects to the reset input R1 of flip-flop FF1 via a diode D1. The set input of flip-flop FF2 connects to the output of inverter 14 as well as to the cathode of a diode D3. The anode of diode D3 is connected back to back with the anodes of diode D1 and diode D2. The output of gate G3 connects to the cathode of diode D2. The output proper of this logic circuit is the output of NAND gate G1 which signals are fed to a monostable multivibrator MF1 whose output pulses are fed to integrator counter 16.

The method in accordance with the invention offers the opportunity to investigate the temporal behavior and amplitude distribution of input signal $U_E$ as a function of time in accordance with many possible distribution functions. The logic circuit 9 includes circuitry to permit all of these different analyzations to be conducted, and programmer 15 provides particular operational selection.

Figure 2:
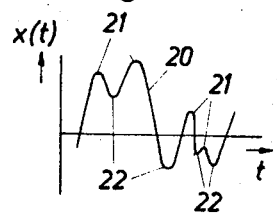
FIGS. 2 through 5 illustrate plots, and graphs identifying particular events to be detected for statistical evaluation.

FIG. 2 illustrates a curve 20, representing a physical quantity X as a function of time. As time progresses, curve 20 has numerous relative maxima 21 and minima 22. The curve 20, when represented by signal $U_E$, will be processed in the circuit of FIG. 1 as follows: At the beginning of an amplitude range scan signal $U_s$ has a particular negative maximum value $U_2$, so that the analyzing band is near the uppermost limit of the amplitude range to be investigated. As the processed information signal $K.U_E$ has definitely amplitude peaks below the positive equivalent of that limit value, the output of summing network 5 is negative. Accordingly, the two comparators 7 and 8 provide similar outputs (K1=K2=1).

As indicated, a control connection leads from logic circuit 9 (signal K2) to the controller 4 for generator 3 providing thereto, for example, a control signal that causes the generator 3 to change its output at a relatively high rate. Thus, the analyzinb band is shifted down relatively fast until one or several peaks are encountered, which is evidenced by a change in state of comparator 8. The resulting change in input for controller 4 causes generator 3 to reduce the slope of the saw tooth signal $U_2$ (or to reduce the stepping rate of stepwise change in output), as now the regular operation begins.

As the signal $U_s$ increases further the analyzing band is shifted down, and relative maxima will be detected by a brief change in output of comparator 8 from false to true that is not followed by a similarly directed change in output of comparator 7. In other words, the two parallel conducted analog to digital conversion processes differ within the analyzing band, and that difference is made to detect e.g., relative maxima. Comparator 8 always changes state from false to true when the input signal $K.U_E$ becomes larger than band limit $-U_s -\Delta U/2$; comparator 7 changes state upon input signal $K.U_E$ exceeding the upper band limit $-U_s + \Delta U/2$, FIG. 2a shows a pulse diagram illustrating signals as they may occur for the detection of relative maxima. The signal K1 is true for longer periods than signal K2, and when a relative maximum occurs in the band, K1 is true while K2 is false. The flip-flop FF1 is always set on K1 turning true producing signal Q1 thereafter. The inverted signal K2 (inverter I4) resets the flip-flop, again via diode D3.

It can readily be seen that NAND gate G1, turns false only when all inputs are true. The two inputs from gates G2 and G4 are permanently ture for SZN=0. The output of I3 is true only after K1 has dropped to zero again when the flip-flop FF1 has not been reset by that time. This occurs only when signal K2 did not turn true while K1 was true and that in turn occurs only for a relative maximum in the analyzing band. Logically, that is defined by K1=1 for a period of time in which K2 stays at the same level. The false or low signal from G1 is in fact inverted by the diode D1 and serves as alternative reset input for FF1, to retain synchronism. As flip-flop FF1 resets, the output of G1 turns true again. The short false output of NAND gate G1 triggers single short MF1 to obtain a counting pulse for counter 16 in representation of a detected relative maximum. As the flip-flops are check operated, the signal $\bar{c}$ from G3 will be true for about a check pulse period.

In order to detect relative maximum in between two zero crossings the sign bit signal K3 is needed actually in inverted configuration, and switch SZN is turned from false to true. Thus, the signal G4 stays true only as along as the information signal is above the zero line. The gates G2 and G3 are not needed and should remain disabled for this type of analysis; the program may, for example, provide a special false input for these gates.

Detection of maxima and minima are actually interchangeable processes, unless both types of extremities are to be detected concurrently. Thus, rather than changing the logic, the same circuit that is used for detecting maxima, can be used for detection of minima, in that programmer 15 causs a polarity reversal of the signal $U_E$ as processed in input circuit 1, whereby the detected maxima of the inverted curve are, of course, equivalent to the detection of minima of the uninverted curve. Still alternatively, the polarity of the output $U_s$ of generator 3 can be reversed or the polarity of the adding process of network 5 is reversed, or inverter T1 is bypassed. In either case, the relative direction of amplitude range scanning is reversed.

The relative maxima or the relative minima or both are regarded as the respective particular events to be counted for example, on a per unit time basis. The counting results in a particular signal Ui representing, as statistical characteristic function, the relative frequency of occurrence of maxima and/or minima in curve 10 and within the respective current band centered around $U_s$. As variable signal $U_s$ scans the amplitude range relatively slowly, gradually or in slow steps, the realtive frequency of occurrence of the maxima is represented by variations in the signal Ui, and this signal Ui is plotted against current value of $-U_s$ to obtain relative maximum/minimum frequency of occurrence versus amplitude characteristic.

Figure 3:
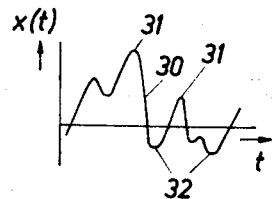

By means of employing the inventive measuring and detection method it is also possible to investigate a physical quantity as to frequency of occurrence of absolute maxima and/or minima in between two zero crossings. FIG. 3 illustrates a function X (t) and the resulting particular curve 30 is to be investigated so as to detect occurrence of absolute maxima or minima in between two zero crossing and within the analyzing band. Such maxima are present, for example, at 31. Analogously, there are absolute minima 32. In these cases an absolute maximum or an absolute minimum within the band represents an event ascertainment of which is to be utilized for developing a statistical characteristic function. FIG. 6a illustrates the relevant signals developed for this case.

The programmer 15, when set for detection of absolute maxima within the current analyzing band, enables similar circuitry as used for detection of relative maxima. For detection of an absolute maxima within the analyzing band, all of the logic circuitry is needed, the sign bit K3 stays true for the period in which an absolute minimum may occur in the analyzing band (except gate G3). The detection is, of course, limited to the period of information signal excursions. above the zero line. Signal K3 is employed for polarity discrimination. The flip-flop FF2 is needed to block detection of a maximum once the information signal has traversed the response level for upper band detector 8. Whenever signal K2 turns true, the absolute maximum cannot possibly be located in the current analyzing band, so that detection of any maximum in the current detection period (K3=1) can only be a relative maximum to be suppressed by definition.

Flip-flop FF2 is provided to detect whether or not the signal level rises above the upper band limit level. When that occurs flip-flop FF2 sets; actually flip-flop FF2 is set when the signal information level drops again (trailing edge of K2). Flip-flop FF2 is reset at the next zero crossing that terminates the intervals of possible maximum detection (trailing edge of K3). Thereafter, the information signal is negative for a while until the next zero crossing. As the sign bit changes again, the set input of flip-flop FF2 is enabled again by gate 64.

For absolute maximum detection, flip-flop FF1 is set as usual on K1 turning true. Flip-flop FF2 is reset under various conditions, but will provide a counting pulse C only when flip-flop FF2 is not set while sign bit K3 stays true.

Flip-flop FF1 will be reset under these conditions: (a) As before, when K2 does turn from false to true via I4 that signal sets also flip-flop FF2, and there will be no maximum detection at all; (b) When flip-flop FF2 is already true, i.e., when absolute maximum cannot possibly be detected, and signal K1 turns false. That reset pulse for the flip-flop FF1 is provided as an alternative via gate G3 and diode D2. It will be seen that concurrently gate G1 will not turn false, and cannot turn false thereafter, so that a counting pulse is not provided; (c) The flip-flop FF1 will be reset when a maximum is detected as before with K1 having turned true, but not K2. However, the resetting is delayed until K3 turns false, G4 turning true so that only on the trailing edge of K3 will there be complete coincidence on G1.

It can thus be seen that flip-flop FF1 detects an absolute maximum and stores that information, but in the last case "storing" is terminated when extension occurs thereafter. In particular it may well occur that reset condition (a) occurs after a maximum was seemingly detected, but a still higher signal extension occurs before the next zero crossing.

FIGS. 6b and 6c show truth tables for illustrating the logic signals Q1 and Q2 as they detect an absolute maximum in the analyzing band in between the two zero crossings, i.e., for detecting whether the absolute maximum between two zero crossings falls into the current analyzing band. A counting pulse is provided at the next zero crossing only. Once FF2 is set, it blocks NAND gate G1 via NAND gate G2 and prevents C from turning false. Only if flip-flop FF1 was not reset prior to the next zero crossing will a counting pulse MF1 be provided, and that occurs only if in fact the maximum that was detected in the analyzing band was not followed by a K2 reset signal for FF2. Any signal K2 after detection of a maximum is indicative of the fact that the detected maximum was not an absolute maximum for the current interval between the two zero crossings. Any signal K2 before maximum detection causes flip-flip FF2 to be set and that inhibits per se production of a pulse C until after the next following zero crossing.

Absolute minima are detected and counted analogously.

Figure 4:
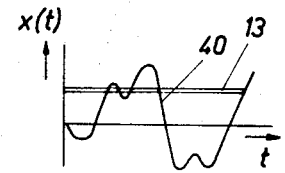

In the foregoing, ascertainment of four different characteristic functions has been described on the basis of detecting maxima and/or minima as characteristic events. Aside from these methods the inventive method offers additional possibilities; e.g., the ascertainment of probability distribution and of probability distribution density, of quantities represented as function of time and detection. FIG. 4 shows the amplitude of physical quantity as a function of time represented by a curve 40, and it is assumed that the probability distribution density is to be ascertained. For ascertaining probability distribution density one has to ascertain the time, i.e., the period of time in which the curve 40 is within the analyzing band. Ascertainment of that compound period per band position and proper processing of the result leads to a function with represents probability distribution density. For this the programmer 15 may enable an "exclusive or" gate 93 in logic 9, providing a true output when the instantaneous value of curve 40 is within the band as represented by different states of comparators 7 and 8. The curve is outside of the band when the comparators have similar states. The duration of response of the "exclusive or" gate is counted. For this, analog type integration may be preferred although digitalization is possible.

Figure 5:
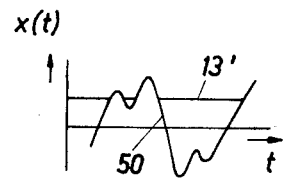

The probability distribution itself can be ascertained through determination of the relative periods for which a curve remains below a threshold level. This is shown representatively in FIG. 5. The threshold level 13' is, of course, variable, and relative periods are ascertained during which, for example, comparator 8 is in the state corresponding to a signal amplitude $K.U_E$ below the threshold as represented by signal $-U_s \Delta U/2$. This particular acquisition process can also be generated by considering the operation as an asymmetric band width analysis, setting the reference input for comparator 8 to zero, and turnign switch SZN off and disregarding the output of comparator 7, so that the band is actually defined by current signal level $U_s$ and lower range limit.

It was presumed in the foregoing, that amplitude signal $U_s$ is steadily variable, or is varied in steps of particular duration to progressively shift location of the analyzing band in the amplitude continuum. However, the inventive method permits stopping of the analyzing band in any particular amplitude level, so as to extend the period of acquisition of the particular event sought to be detected. If counter or integrator 16 is operated to provide output or a per unit time basis, then the duration of an analyzing step at a particular amplitude level $U_s$ is immaterial except that it should be long enough to meet the requirement of statistical observation, and that may require extension of the observation period.

The invention is not limited to the embodiments described above but all changes and modifications thereof not constituting departures from the spirit and scope of the invention are intended to be included.

We claim:

1. Apparatus for analyzing dynamic processes represented by a particular time variable information signal within a range for amplitudes of the signal comprising:
   first means for providing two low resolution analog to digital conversion of the information signal at different amplitude levels for bit value changes when the information traverses the respective level, for defining a signal analyzing band, the first means including means to provide a signal bit for both of the conversions;
   second means connected to the first means to provide thereto the time variable signal;
   third means connected to be responsive to the digital signals as provided by the first means and logically processing them as to differences between them in representation of a particular characteristic portions of the information signal when occurring within the band, and providing output signals representative thereof;
   fourth means for selectively switching the sign bit into and out of the third means, to vary the significance of the characteristic portion to be represented by the output signal;
   fifth means connected to the first and second means to vary the different amplitude levels in unison corresponding to shifting the analyzing band within the amplitude range for the signal; and
   sixth means connected to the third means to accumulate the output signals as statistical representation evaluation of the occurrence of the characteristic portions in dependence upon amplitude as represented by the amplitude variable representation of position of the analyzing band within the amplitude range.

2. Apparatus as in claim 1, the fifth means providing a steadily, time variable signal in representation of amplitude range scanning, there being means to superimpose the time variable information signal and the range scan signal to obtain range scanning.

3. Apparatus as in claim 1, the third means responsive to temporary differences of the digital signals in representation of a maximum or minimum in the band and providing a counting signal in representation thereof.

4. Apparatus as in claim 3, including means operating in response to the sign bit for deferring detection of a maximum or minimum until the sign bit changes.

5. Apparatus as in claim 1, the fifth means providing an amplitude scan signal variable between first and second limits defining the amplitude analyzing range, the value of the scan signal defining the position of the analyzing band within the amplitude range.

6. Apparatus as in claim 5, at least one of the first and second limits being adjustable.

7. Apparatus as in claim 5, including means to reverse the relationship between scan direction and polarity of the information signal.

8. Apparatus as in claim 1, including sixth means for adjusting the rate of shifting as provided by the fifth means.

9. Apparatus as in claim 8, the sixth means operating the fifth means for providing relative fast shifting of the analyzing band until the third means has detected at least one said characteristic portions, and operating the fifth means subsequently for a slower rate of shifting.

10. Apparatus as in claim 1, the third means including first circuit means responsive to a temporary change in output by one of the converters not accompanied by a change in output by the other one of the converters to obtain a logic signal; and second circuit means responsive to the termination of the change in output by the one converter to provide a counting signal.

11. Apparatus as in claim 10, including additional circuit means responsive to the signals and to defer production of the counting signal until the sign bit changes in dependence of absence of any change in output of the other converter for a period of no change in the sign bit.

12. Apparatus as in claim 10, including means for inverting the effective direction of information signal excursions.

* * * * *